May 26, 1931. J. J. GILBERT 1,806,754
CABLE SIGNALING SYSTEM
Filed May 25, 1929
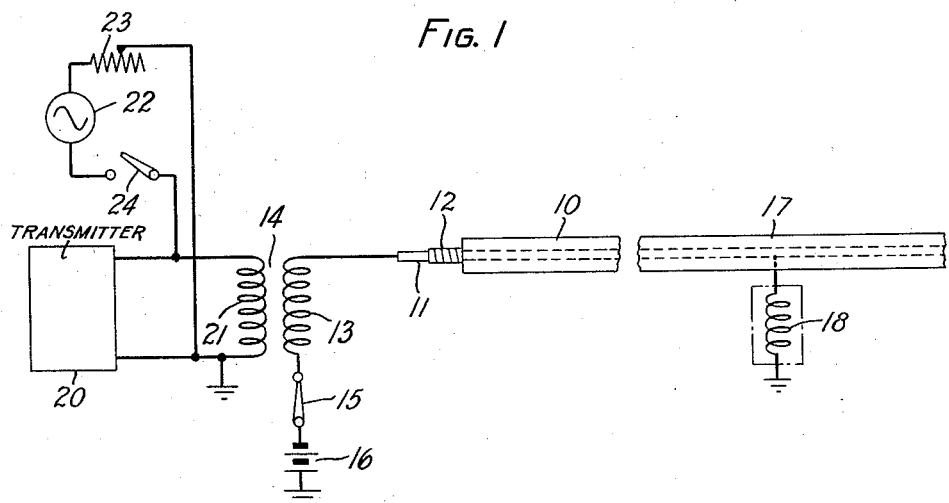
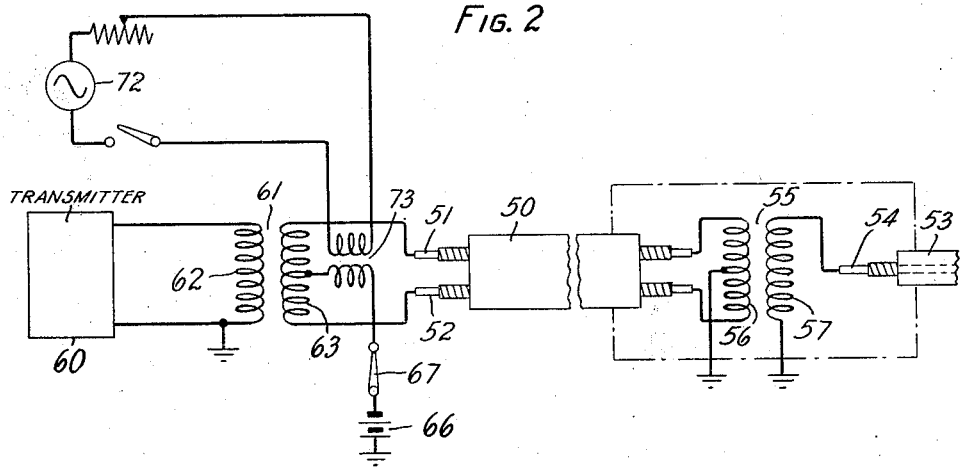
INVENTOR
J. J. GILBERT
BY
J. W. Schmied
ATTORNEY Patented May 26, 1931

1,806,754

UNITED STATES PATENT OFFICE

JOHN J. GILBERT, OF DOUGLASTON, NEW YORK, ASSIGNOR TO BELL TELEPHONE LABORATORIES, INCORPORATED, OF NEW YORK, N. Y., A CORPORATION OF NEW YORK

CABLE SIGNALING SYSTEM

Application filed May 25, 1929. Serial No. 365,936.

The present invention relates to cable signaling systems and particularly to means for improving the electrical properties of loaded signaling conductors.

A characteristic of loaded conductors of importance particularly in submarine signaling is the increase of inductance and of effective resistance with the signaling current which may have the undesirable effect of modulating the signals, resulting in distortion, and also of increasing the attenuation especially in the portion of the cable adjacent the transmitting terminal with a consequent loss of efficiency of transmission.

In applicant's Patent No. 1,763,041, granted June 10, 1930, there is described a method of reducing the attenuation and distortion in a loaded signaling conductor by loading the cable more heavily over its central portion than over the terminal portion.

It has been proposed to subject loaded submarine cables during or after their manufacture to the demagnetizing action of alternating currents for the purpose of rendering the properties of the cables more uniform. See, for example, British Patents 228,827 and 235,570.

In applicant's Patent No. 1,730,971, granted Oct. 8, 1929, there is described a method of reducing the attenuation and distortion in a loaded cable by subjecting the whole of the cable or portions thereof to the simultaneous action of a unidirectional field and of an alternating field superimposed upon the unidirectional field, the alternating field being gradually diminished to zero from a value sufficient to stabilize the loading material.

In accordance with the present invention the stabilization of the loading material is partially brought about during the signaling and is confined to the terminal portions of the cable.

An object is to reduce the voltages applied to the cable for the purpose of stabilization in order to eliminate the danger of breaking down the insulation.

Another object is to make it possible to restore the properties of the cable at any time after it has been put into service and to reduce the frequency of interruptions of the service for the purpose of stabilization.

It has been observed that the effective inductance of a loaded submarine cable conductor is variable with the signaling current or applied magnetizing forces. As disclosed in the Patent No. 1,730,971, referred to above it has been found that by subjecting the loading material of such a cable to a unidirectional magnetizing force of appropriate value and superimposing upon that force an alternating magnetizing force which is gradually reduced to zero from a value determined by the requirements of the cable, the variation in inductance with increase in signaling current may be reduced and the ratio of the effective resistance to the inductance decreased. For the purposes of explanation this treatment of the loaded cable will be referred to herein as stabilization.

The invention is based upon the observation that the effects referred to above are most pronounced near the terminal of the cable and are practically negligible in long stretches of the central portion of the cable, at least when the cable is of considerable length.

It has also been found that due to the high resistance of long cables it is necessary to apply a comparatively high voltage at one or both terminals thereof in order to attain a unidirectional current of sufficient strength to produce the desired unidirectional field for the purpose of stabilization.

For these reasons the stabilizing unidirectional current in accordance with the invention is applied to only the terminal portions of the cable, the length of such portions being determined by the particular requirements in each case.

For this purpose a ground connection is made to the cable conductor at a point off shore over which the current from a direct current source connected to the end of the cable will find a return path through earth to the source. Since the impedance of this portion of the cable is considerably less than that of the total cable the voltage of the direct current source for producing a given current needs to be of only a moderate value.

Means are employed to prevent the signaling current from leaving the cable over this earth connection, as will be described later.

The alternating current for producing the superimposed alternating field in the loading material may pass over the total length of the cable or may be confined to the terminal section to which the direct current is applied.

Since the direct current may be maintained in the cable without interfering with the signaling, advantage is taken in accordance with the invention of the stabilizing effect obtained by superimposing the signaling currents upon the direct current in the terminal section of the cable.

In the accompanying drawings, Fig. 1 is a simplified diagrammatical showing of a portion of a continuously loaded cable and its terminal equipment arranged for stabilization in accordance with the invention, and Fig. 2 is a simplified diagram of a similar system arranged for stabilization of the terminal end of a submarine cable and its sea-earth return.

The invention will now be described in connection with the attached drawings as applied to two specific embodiments which represent the preferred forms of the invention and serve as typical examples. The invention may be applied to other specific cases and in various other ways than those shown in the drawings.

Thus, in Fig. 1 means in accordance with the invention are shown applied to a continuously loaded submarine cable 10 which has a conducting core 11 surrounded by a layer of loading material 12 applied in any desirable manner. The conductor 11 is connected through winding 13 of transformer 14 through switch 15 to battery 16 and ground. At a point 17 off shore the conductor 11 is connected through an inductance coil 18 to ground. The disclosure of coil 18 in the drawing is purely diagrammatic. The impedance of inductance 18 is sufficiently high at signaling frequencies to prevent material current at the signaling frequencies from passing to ground over the ground connection at point 17. The ohmic resistance, however, may be made very low in order to reduce the voltage drop therein due to the current from battery 16, and will be very small compared with the total ohmic resistance of the cable beyond point 17. In this manner only a comparatively low voltage source 16 is needed for producing a current of sufficient strength to produce the desired unidirectional magnetic field in the loading material 12 in the terminal portion of the cable.

20 represents the usual terminal apparatus and may comprise transmitting or receiving equipment or both and may be arranged for telegraph or telephone signaling. The equipment 20 is connected to transformer winding 21 of transformer 14 and thus is inductively coupled to the cable conductor 11 either for transmission or for reception of signals.

During ordinary operating conditions the switch 15 is closed and a direct current is maintained from the battery 16 over the terminal portion of the cable 10 at the same time as signals from equipment 20 are impressed upon the cable through transformer 14. The signaling currents induced in winding 13 flow over a path from ground at battery 16 over the conductor 11 through the whole length of the cable to ground connection at the other terminal not shown, the high impedance of coil 18 preventing the signals from returning over the ground connection at 17.

It has been found that a cable properly stabilized may retain its stabilized properties for considerable periods of time under operating conditions such as just described.

However, it may from time to time become necessary to restabilize the cable or at least the terminal portion thereof. For this purpose an alternating current generator 22 is connected over a variable resistance 23 and a switch 24 to the transformer winding 21 whereby an alternating current may be induced upon the cable which in the arrangement shown would follow the same path as the signaling currents in the cable. The alternating current from the source 22 may be varied by means of resistance 23 from a value sufficient to bring about the desired stabilization and gradually be reduced to zero. During the special stabilization treatment the equipment 20 may be disconnected from transformer 14 if desired.

In Fig. 2 the invention is shown applied to a submarine cable signaling system in which the shore end 50 is a form of a twin core cable comprising loaded conductors 51 and 52 and is continued in a single core cable 53 comprising a loaded conductor 54. The twin core cable typifies any two parallel, loaded conductors. The cables 50 and 53 are inductively coupled by means of a submerged transformer 55 having windings 56 and 57. At the terminal station the cable 50 is inductively coupled to the terminal equipment 60 by means of transformer 61 having windings 62 and 63.

In this system it becomes necessary to provide for stabilization of both loaded conductors 51 and 52. For this purpose the grounded source 66 is connected through switch 67 to the midpoint of winding 63 of transformer 61 at which point the current from battery 66 divides evenly, passes over conductors 51 and 52 in multiple and again unites at the middle point of winding 56 of transformer 55 to ground.

Signal waves transmitted from the terminal equipment 60 are induced in the two halves of winding 63, which are connected in series aiding relation, are sent out over one conductor, say 51, through the winding 56 of transformer 55 and return over the other conductor 52 to winding 63. The signal waves are impressed by means of the transformer 55 upon the single conductor cable 53 over which they proceed to the other terminal of the cable (not shown) which may or may not be equipped similarly to the terminal end shown. A ground return is provided for this portion of the cable. When the midpoints of windings 63 and 56 are carefully located there will be no loss of signal current over the ground return circuit.

It is evident that the signaling current will be superimposed upon the direct current in the two conductors 51 and 52 with an effect similar to that obtained in the arrangement shown in Fig. 1.

In order to provide for the occasional stabilization of the conductors 51 and 52 an alternating current source 72 is provided as in the system shown in Fig. 1 and may be connected in the manner shown. The source 72 is coupled by means of a transformer 73 to the common direct current circuit from battery 66. The impulses induced in this circuit from source 72 are superimposed upon the direct current therein and follow the same double path through conductors 51 and 52 and the ground return circuit as does the direct current from battery 66. Consequently these impulses are not impressed on the cable 53 or upon the terminal equipment 60, since they neutralize themselves in the two halves of winding 56 as well as winding 63 which in this circuit are in opposition. The means for and method of gradually reducing the alternating current to zero are as in Fig. 1.

What is claimed is:

1. A method of transmitting signals over a long cable loaded with a magnetic material which comprises simultaneously impressing upon a terminal section of said cable a series of signals and a unidirectional current to improve the magnetic characteristics of said magnetic material in said section and confining said unidirectional current to said section to limit the voltage necessary to impress said unidirectional current.

2. A method of operating a continuously loaded submarine cable which comprises the step of impressing only upon a long terminal section of said cable a direct current simultaneously with the steps of alternately impressing upon said cable a signaling current and an alternating current which is gradually diminished to a zero value from a value sufficient to stabilize said cable.

3. A method of signaling over a long cable loaded with magnetic material which comprises super-imposing upon a unidirectional current the impulse current of a series of signals, impressing said currents on a terminal of said cable and withdrawing said unidirectional current from such central section of the cable where the effect of the impulse current upon the magnetic characteristics of said material is negligible.

4. A method of reducing the attenuation of signals in a long submarine cable continuously loaded with magnetic material which comprises selecting a plurality of sections of said cable and producing unidirectional magnetic fluxes in the magnetic material in said sections during the transmission of signal currents, the value of the flux in any one section being determined by the effect of the signal currents on the characteristic of the magnetic material in said section.

5. In a signaling system, a cable loaded with a magnetic material, a signaling source, a localized circuit including a long terminal section of said cable and a return path, and a source of unidirectional current connected to said circuit.

6. In a signaling system, a submarine cable having a conductor loaded with magnetic material, a characteristic of which is influenced more in one section of the cable than in another by the signaling current, a signaling source and a direct current source connected to said cable and a return path connection to said conductor at a point between said sections for current from said direct current source.

7. In a signaling system, a submarine cable having a conductor loaded with magnetic material and having a plurality of long sections, a signaling source and a direct current source connected to said cable, a return path connection to said conductor at a point between two of said sections for passing current from said direct current source and including an inductance for shutting out the signaling current from said return path.

8. In a signaling system, a submarine cable loaded with a magnetic material and having a terminal section, a signaling source, a transformer coupling between said source and said cable, a ground connection for the distant end of said terminal section including an inductance device, and a grounded source of direct current connected through a winding of said transformer to said terminal section.

9. In a signaling system, a submarine cable loaded with a magnetic material and having a terminal section, a signaling source and a source of alternating current associated with means for varying the alternating current, a transformer coupling for interconnecting said signaling source and said cable, a grounded connection for the distant end of said terminal section including an inductance device, and a source of direct current connected through a winding of said transformer to said terminal section.

10. In a signaling system, a loaded submarine cable comprising a shore section and a deep sea section, said shore section being grounded at both ends, a direct current source connected to said shore section to produce a unidirectional field in the loading of said section, a signaling source and an alternating current source for superimposing an alternating field upon the unidirectional field produced by said direct current source in the loading of said terminal section.

11. In a signaling system, a loaded submarine cable having a shore section and a deep sea section, said shore section comprising a pair of continuously loaded conductors, a direct current source, a circuit for said source including said pair of conductors in parallel and a signaling source inductively coupled to said pair of conductors for superimposing signaling currents upon the current from said direct current source in said pair of conductors.

12. In a signaling system, a continuously loaded submarine cable comprising a shore section and a deep sea section, said shore section comprising a pair of conductors, a signaling source, an inductive coupling between said source and said pair of conductors, another inductive coupling between said deep sea section and said shore section, a direct current source connected over mid-points on said inductive couplings to said pair of conductors in multiple and an alternating current source connected between said midpoints.

In witness whereof I hereunto subscribe my name this 16th day of May, 1929.

JOHN J. GILBERT.